United States Patent
Esteban Finck et al.

(10) Patent No.: US 10,189,035 B2
(45) Date of Patent: Jan. 29, 2019

(54) MACHINE FOR MIXING AND SUCCESSIVELY APPLYING SEALANT MATERIAL

(71) Applicant: Airbus Defence and Space S.A., Getafe (ES)

(72) Inventors: Fernando Enrique Esteban Finck, Getafe (ES); Cristóbal León Campos, Getafe (ES); Daniel Rico Iglesias, Getafe (ES)

(73) Assignee: Airbus Defence and Space S.A., Getafe (ES)

( * ) Notice: Subject to any disclaimer, the term of this patent is extended or adjusted under 35 U.S.C. 154(b) by 188 days.

(21) Appl. No.: 15/135,335

(22) Filed: Apr. 21, 2016

(65) Prior Publication Data
US 2016/0318049 A1 Nov. 3, 2016

(30) Foreign Application Priority Data

Apr. 21, 2015 (EP) .................... 15382195

(51) Int. Cl.
- *B05B 7/12* (2006.01)
- *G05D 11/13* (2006.01)
- *B05B 7/04* (2006.01)
- *B05B 7/24* (2006.01)

(52) U.S. Cl.
CPC ............ *B05B 7/12* (2013.01); *B05B 7/0408* (2013.01); *B05B 7/24* (2013.01); *G05D 11/132* (2013.01)

(58) Field of Classification Search
None
See application file for complete search history.

(56) References Cited

U.S. PATENT DOCUMENTS

| | | | | |
|---|---|---|---|---|
| 4,519,246 A | * | 5/1985 | Hartemink | G01F 1/6847 73/202.5 |
| 5,499,745 A | * | 3/1996 | Derian | B01F 15/047 222/136 |
| 2006/0283885 A1 | | 12/2006 | Dolman et al. | |

FOREIGN PATENT DOCUMENTS

| | | |
|---|---|---|
| EP | 0 605 063 | 7/1994 |
| EP | 1 113 839 | 11/2004 |
| GB | 2 454 783 | 5/2009 |
| WO | 2009/140776 | 11/2009 |

OTHER PUBLICATIONS

Extended European Search Report in European Patent Application No. 15382195.4 dated Oct. 27, 2015.

* cited by examiner

*Primary Examiner* — Nathan T Leong
(74) *Attorney, Agent, or Firm* — Nixon & Vanderhye P.C.

(57) ABSTRACT

A machine (21) for mixing and applying continuously a bi-component sealing material formed by mixing a base and a hardener in a pre-established ratio that is used, for example, in joining areas of structural elements of aircraft structures. Their metering chambers (25, 25') are configured with a volumetric ratio between them adapted to the volumetric ratio of mixture of the base and the hardener and the pushing device (31) comprises means for actuating the pistons (33, 33') allowing different displacement speeds and control means so that the outflow of said metering chambers (25, 25') is that required for the base and hardener can reach the mixing head (43) in a pre-established weight ratio.

12 Claims, 1 Drawing Sheet

MACHINE FOR MIXING AND SUCCESSIVELY APPLYING SEALANT MATERIAL

RELATED APPLICATION

This application claims priority to European Patent Application No. 15382195.4, filed Apr. 21, 2015, the entirety of which is incorporated by reference.

FIELD OF THE INVENTION

The present invention relates to a machine for mixing and successively applying sealant material in joining areas of structural elements and particularly of structural elements belonging to aircraft structures.

BACKGROUND

The sealant material applied to joining areas of structural elements of aircraft structures is a bi-component material (base and hardener) of very high viscosity. The mixture of both components must be performed ensuring the correctness of the proportion of each component to guarantee the quality of the sealant material.

In this respect, WO 2009/140776 describes an installation to perform said mixture.

Since the mixing of the base and the hardener initiates the solidification of the sealant material it has been considered desirable to separate the process of mixing the base and the hardener from the process of application of the sealant material.

In that sense, a method widely used is the application of the sealant material by means of a pneumatic gun that extrudes the sealant material contained in a cartridge through a nozzle. These cartridges are filled with a mixture of the two components carried out in industrial premises handling large amounts and subsequently frozen to halt the curing reaction. Previously to their use in a pneumatic gun they are defrosted.

The use of such cartridges have a high cost which is a drawback for, particularly, the aeronautic industry that requires the application of different sealing materials during aircraft assembly.

SUMMARY OF THE INVENTION

The invention, in one embodiment, provides a machine for mixing and successively applying a bi-component sealing material formed by mixing a base and a hardener in a pre-established relationship. The machine comprises:

storage tanks of the base and the hardener;

metering chambers of the base and the hardener configured with a volumetric ratio between them adapted to the volumetric mixing ratio of the base and the hardener and connected to said storage tanks by inlet hoses;

a pushing device with two pistons, operable so as to permit displacing them at different speeds, that run the metering chambers to drive the base and the hardener of the sealing material to two outlet hoses;

an applicator device of the sealing material including a mixing head connected to said outlet hoses and a static mixing device;

at least two devices for measuring the flow of base and hardener in said outlet hoses;

a control system, such as a processor executing program steps, that can vary the displacement speed of said pistons so that the outflow of the said metering chambers is that required for the base and the hardener can reach the mixing head in the pre-established weight ratio.

In an embodiment, said flow measurement devices comprise two first devices close to the outlet of the metering chambers and two second devices close to the mixing head. This allows better control in the case of long outlet hoses. Preferably said flow measurement devices are mass flowmeters. This facilitates control of the mixing ratio in the pre-established weight ratio which is the relevant one in two-component sealing materials.

In one embodiment, the applicator device is incorporated into a manually operable dispensing gun. In that case, the machine may incorporate displacement means to accompany the operator where necessary.

In another embodiment, said applicator device is embarked on a robot head. In this case, the machine can incorporate displacement means to accompany the robot on its displacements or go fully embarked on it.

Other desirable features and advantages of this invention will become apparent from the subsequent detailed description of the invention and the appended claims, in relation with the enclosed drawings.

DETAILED DESCRIPTION OF THE INVENTION

Figure 1:
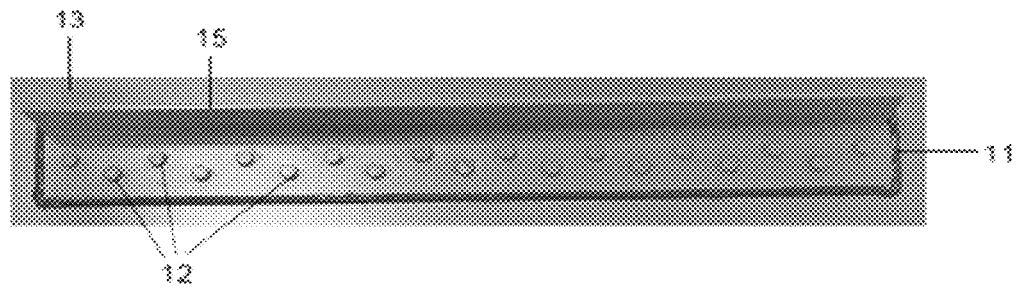
FIG. 1 is a perspective view of a sealing bead in an aircraft structure.

FIG. 1 shows a sealing bead 11 applied around a stiffening element 15 that is attached to another structural element 13 of an aircraft structure by means of rivets 12.

To apply a sealant bead 11 as that of FIG. 1 as well as interposition and encapsulating sealants in aircraft structures the invention provides the machine 21 to be described subsequently whose basic aim is to get that the mixture of the base and the hardener takes place directly just at the time to be applied without using special devices such as the cartridges mentioned above.

The machine 21 for mixing and applying sealing material is formed by the following elements:

Two storage tanks 23, 23' for the base and the hardener of the sealing material. Relevant properties of the bases and hardeners of two sealing materials used in the aircraft industry are indicated in Table A below.

TABLE A

| Property | Units | PR1782-B2 | MC 780-B2 |
|---|---|---|---|
| Base viscosity | Pa · s | 1000 ± 200 | 1400 ± 400 |
| Hardener viscosity | Pa · s | entre 40 y 200 | Máx. 400 |
| Base density | g/cm$^3$ | 1.00 ± 0.04 | 1.04 ± 0.04 |
| Hardener density | g/cm$^3$ | 1.76 ± 0.04 | 1.70 ± 0.05 |
| Cured material density | g/cm$^3$ | 1.15 | 1.09 ± 0.04 |
| Mixing ratio (by weight) | — | 100:12 | 100:10 |
| Mixing ratio (by volume) | — | 100:7 | 100:6.2 |

Two metering chambers 25, 25' of the base and the hardener of the sealing material.

An applicator device 41 of the sealing material comprising a mixing head 43 and a static mixer 45.

Inlet hoses 27, 2' to carry the base and hardener from the storage tanks 23, 23' to the metering chambers 25, 25'. Follower plate pumps can be used for the transfer.

A pushing device 31 with two pistons 33, 33, independently driven, that run the metering chambers 25, 25' to meter the base and the hardener in a fixed and homogenous and fixed ratio.

Outlet hoses 29, 29' to carry properly metered quantities of the base and the hardener to the applicator device 41.

Flow measurement devices 35, 35'; 37, 37' at the beginning and at the end of the outlet hoses 29, 29'.

A control means, such as a processor in a control system, to ensure that the outlet hoses 29, 29' carry to the applicator device 41 amounts of the base and the hardener in the proportions by weight preset for the sealing material.

To achieve its intended purpose, the machine 21 combines various methods of regulation of the dosage of the base and the hardener.

Figure 2:
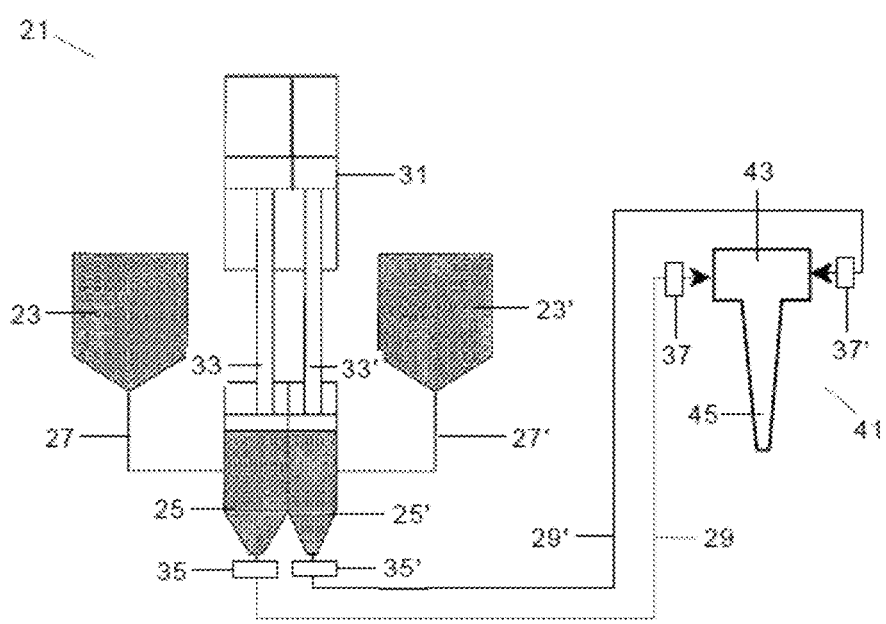
FIG. 2 is a schematic diagram illustrating the structure of a machine for mixing and successively applying sealing material according to the invention.

Firstly, the metering chambers 25, 25' are configured with a volumetric ratio adapted to the mixing ratio by volume of the base and the hardener. For example a machine 21 configured with a volumetric ratio of 100:11 between the metering chambers 25, 25' (FIG. 2 does not represent this ratio) would be adapted for use the above-mentioned sealants PR1782-B2 and MC 780-B2 whose mixing ratios by volume 100:12 and 100:10 are very close to said volumetric ratio. With that configuration, the application of the same pressure by pistons 53, 53' would already produce a dosage close to the desired.

Secondly, the pushing device 31 is provided with means for varying the speed of each of the pistons 33, 33' allowing applying different pressures in each of the metering chambers 25, 25' to compensate for any mismatches between the volume ratio of the metering chambers 25, 25' and the desired mixing ratio by weight between base and hardener.

Thirdly, the flow measurement devices 35, 35'; 37, 37' in the outlet hoses 29, 29' provide the information needed so that to the control means of the machine 21 (not shown) can dynamically calculate the displacement speeds of the pistons 33, 33' required to achieve the desired mixing ratio between base and hardener.

Since this ratio is established as a weight ratio, said flow measurement devices 35, 35'; 37, 37' are preferably mass flowmeters. In this regard it should be noted that base and hardener are compressible fluids and that, therefore, the use of volumetric devices may cause measurement errors since base and hardener can be at pressures different to the atmospheric pressure in the metering chambers 25, 25' and the outlet hoses 29, 29'.

The ranges of volumetric and mass flow rates that can be achieved in the outlet hoses 29, 29' of the machine 21 for sealing materials PR1782-B2 and MC780-B2 are indicated below in Table B, for illustrative purposes.

TABLE B

| Property | Units | PR1782-B2 | MC780B2 |
| --- | --- | --- | --- |
| Base max. flow | cm³/min | 392.35 | 395.48 |
| Hardener max. flow | cm³/min | 27.649 | 24.518 |
| Base min. flow | cm³/min | 9.3416 | 9.416 |
| Hardener min. flow | cm³/min | 0.6583 | 0.5837 |

TABLE B-continued

| Property | Units | PR1782-B2 | MC780B2 |
| --- | --- | --- | --- |
| Base max. mass flow | gr/min | 392.35 | 411.2992 |
| Hardener max. mass flow | gr/min | 48.662 | 41.6806 |
| Base min. mass flow | gr/min | 9.3416 | 9.7926 |
| Hardener min. mass flow | gr/min | 1.158 | 0.9922 |

Being a mixing and application machine, it is a machine of reduced size machine which can, therefore, be easily moved.

If the applicator device 41 is incorporated in a manually operable dispensing gun, the machine 21 can be mounted on a wheeled cart which allows the operator move it easily.

If the applicator device 41 is mounted on the head of a robot, the machine 21 can be embarked into the robot.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A machine for mixing and successively applying a bi-component sealing material formed by mixing a base and a hardener in a pre-established ratio comprising:
    storage tanks including a first storage tank for the base and a second storage tank for the hardener;
    metering chambers including:
        a first metering chamber for the base and having an inlet connected to a first inlet hose extending from the first storage tank, and
        a second metering chamber for the hardener and having an inlet connected to a second inlet hose extending from the second storage tank,
        wherein a first volume of the first metering chamber and a second volume of the second metering chamber are related such that a volumetric ratio of the first and second volumes conforms to a desired volumetric ratio of a mixture of the base and the hardener;
    a pushing device including:
        a first piston in the first metering chamber and configured to push the base from the first metering chamber and through a first outlet of the first metering chamber, and
        a second piston in the second metering chamber and configured to push the hardener from the second metering chamber and through a second outlet of the second metering chamber;
        wherein the pushing device comprises an actuator configured to move the first and second pistons at displacement speeds determined by a control system to push the base from the first metering chamber and the hardener from the second metering chamber;

an applicator device including a mixing head having inlets each connected to a respective one of the first and second outlets of the first and second metering chambers, a static mixer configured to mix the hardener and base flowing from the first and second metering chambers, and a third outlet through which a mixture of the hardener and base flows from the static mixer; and at least two flow measurement devices configured to measure a flow of the base and a flow of the hardener from the first and second outlets, wherein the control system is configured to vary the displacement speeds of said first and second pistons so that a ratio of the flows of the hardener and the base from the first and second outlets conforms to a preestablished ratio of the base and the hardener based on weight or volume of the base and the hardener, wherein the control system, while the pushing device pushes the first and second pistons, repeatedly: (i) receives data from the at least two flow measurement devices indicative of the flows from the first and second metering chambers of the base and the hardener, (ii) calculates the displacement speeds for each of the first and second pistons based on the received data, and (iii) applies the calculated displacement speeds to command the pushing device to move the first and second pistons at their respective displacement speeds.

2. The machine according to claim 1, wherein said at least two flow measurement devices comprise:
   two first flow measurement devices proximate the first and second outlets of the first and second metering chambers, and
   two second flow measurement devices proximate the mixing head.

3. The machine according to claim 1, wherein said at least two flow measurement devices are mass flow meters.

4. The machine according to claim 1, wherein said applicator device is incorporated into a manually operable dispensing gun.

5. The machine according to claim 1, wherein said applicator device is embarked in a head of a robot.

6. The machine according to claim 1, wherein the desired volume ratio of the hardener and the base is in a range of 6 to 100.

7. The machine according to claim 1, wherein a maximum viscosity of the base is 1800 pascal seconds and a maximum viscosity of the hardener is 400 pascal seconds.

8. The machine for mixing in claim 1, wherein the first metering chamber is connected to the first storage tank while the base flows the first metering chamber into the applicator device, and the second metering chamber is connected to the second storage tank while the hardener flows from the second metering chamber into the applicator device.

9. A mixing machine comprising:
   a first metering chamber configured to receive and dispense a viscous base to a first conduit, wherein the first metering chamber includes a first inlet connected to a supply of the viscous base and a first outlet configured to dispense the viscous base from the first metering chamber;
   a second metering chamber configured to receive and dispense a viscous hardener to a second conduit, wherein the second metering chamber includes a second inlet connected to a supply of the viscous hardener and a second outlet configured to dispense the viscous hardener from the second metering chamber, and further wherein a ratio of a first volume of the first metering chamber and a second volume of the second metering chamber conforms to a desired volumetric ratio of a mixture of the base and the hardener;
   a first piston in the first metering chamber and configured to move through the first metering chamber to displace the viscous base from the first metering chamber, through the first outlet, and into the first conduit;
   a second piston in the second metering chamber and configured to move through the second metering chamber to displace the viscous hardener from the second metering chamber, through the second outlet and into the second conduit;
   a mixing head coupled to the first and second conduits and configured to receive the viscous base from the first conduit and the viscous hardener from the second conduit, wherein the mixing head is configured to receive and mix the viscous base and the viscous hardener;
   a control system configured to, during movement of the first and second pistons and the displacements of the viscous base and the viscous hardener into the first and second conduits respectively, wherein the control system repeatedly: (i) calculates a first flow rate for the viscous base and/or a second flow rate for the viscous hardener to achieve a mixture of the base and hardener in mixing head, wherein the mixture has a certain ratio by mass of the base and the hardener; (ii) calculates a first displacement rate of the first piston to achieve the first flow rate and/or a second displacement rate of the second piston to achieve the second flow rate, and (iii) commands the actuator to simultaneously displace the first piston at the first displacement rate and/or the second piston at the second displacement rate, and
   an actuator connected to the first and second pistons and configured to respond to the commands of the control system by displacing the first piston at the first displacement rate and/or the second pistons at the second displacement rate.

10. The mixing machine of claim 9 further comprising:
    a first flow meter coupled to at least one of the first metering chamber and the first conduit, and configured to generate a first signal indicative of a flow rate of the viscous base flowing through the first conduit; and
    a second flow meter coupled to at least one of the second metering chamber and the second conduit, and configured to generate a second signal indicative of a flow rate of the viscous hardener flowing through the second conduit;
    wherein the control system is configured to automatically adjust the first or second displacement rate based on the first or second signals.

11. The mixing machine of claim 9 wherein the mixing head is in a hand-held device.

12. The machine for mixing in claim 9, wherein the first metering chamber is connected to the first storage tank while the base flows the first metering chamber into the mixing head, and the second metering chamber is connected to the second storage tank while the hardener flows from the second metering chamber into the mixing head.

* * * * *